(12) United States Patent
Aoki

(10) Patent No.: US 8,297,646 B2
(45) Date of Patent: Oct. 30, 2012

(54) CLIP FOR AIRBAG

(75) Inventor: Ryou Aoki, Kanagawa (JP)

(73) Assignee: Piolax Inc., Yokohama-Shi, Kanagawa (JP)

(*) Notice: Subject to any disclaimer, the term of this patent is extended or adjusted under 35 U.S.C. 154(b) by 62 days.

(21) Appl. No.: 12/734,663

(22) PCT Filed: Oct. 15, 2008

(86) PCT No.: PCT/JP2008/068616
§ 371 (c)(1),
(2), (4) Date: Aug. 11, 2010

(87) PCT Pub. No.: WO2009/063715
PCT Pub. Date: May 22, 2009

(65) Prior Publication Data
US 2010/0295272 A1    Nov. 25, 2010

(30) Foreign Application Priority Data
Nov. 16, 2007    (JP) .................... P2007-298119

(51) Int. Cl.
*B60R 21/20* (2006.01)
(52) U.S. Cl. .................. 280/728.2; 280/730.2; 24/457; 411/522
(58) Field of Classification Search ............... 280/728.2, 280/730.2; 24/289, 293, 295, 457, 458; 296/1.08; 411/508, 522, 523, 524
See application file for complete search history.

(56) References Cited

U.S. PATENT DOCUMENTS
6,431,584 B1 * 8/2002 Nagasawa et al. ......... 280/728.2
(Continued)

FOREIGN PATENT DOCUMENTS
JP   2000-255370   9/2000
(Continued)

OTHER PUBLICATIONS

Hosoya et al., Air Bag Device, Oct. 10, 2001, JPO, JP 2001-277984 A, English Abstract.*
Hosoya et al., Air Bag Device, Oct. 10, 2001, JPO, JP 2001-277984 A, Machine translation of Description.*
(Continued)

*Primary Examiner* — Paul N Dickson
*Assistant Examiner* — James English
(74) *Attorney, Agent, or Firm* — McGinn IP Law Group, PLLC

(57) ABSTRACT

To provide a clip for an airbag, the pin member of which can be easily removed from a grommet by a simple operation even in a state in which a garnish is furnished. A clip 1 for an airbag includes: a grommet 10; and a pin member 20. The grommet 10 includes: a supporting hole 12 into which the pin member 20 is inserted from the surface side the back side; and an engaging portion 15 for preventing the pin member 20 from coming out from the supporting hole 12. The pin member 20 includes a pair of sidewalls 22 opposed to each other which are extended from a head portion 21 in the axial direction and inserted into a supporting hole 12 of the grommet 10 and freely, relatively moved in the axial direction with respect to the grommet 10. In a state in which the second engaging portion 26 of each sidewall 22 is engaged with the engaging portion 15 of the grommet 10, when a flexible region 25, which is exposed from the supporting hole 12 onto the surface side of the grommet 10, is deflected, this state of engagement can be released.

17 Claims, 15 Drawing Sheets

U.S. PATENT DOCUMENTS

| | | | |
|---|---|---|---|
| 6,910,840 B2 * | 6/2005 | Anscher | 411/41 |
| 6,932,552 B2 * | 8/2005 | Anscher et al. | 411/41 |
| 6,952,863 B2 | 10/2005 | Draggoo et al. | |
| 7,073,231 B2 * | 7/2006 | Draggoo et al. | 24/297 |
| 7,219,400 B2 * | 5/2007 | Tashima et al. | 24/297 |
| 7,841,817 B2 * | 11/2010 | Kawai | 411/45 |
| 7,900,953 B2 * | 3/2011 | Slobodecki et al. | 280/728.2 |
| 7,976,056 B2 * | 7/2011 | Kirchen et al. | 280/728.2 |
| 8,038,167 B2 * | 10/2011 | Slobodecki et al. | 280/728.2 |
| 8,043,038 B2 * | 10/2011 | Sano | 411/45 |
| 2002/0024206 A1 | 2/2002 | Nagasawa et al. | |
| 2003/0107202 A1 | 6/2003 | Tajima et al. | |
| 2008/0028577 A1 * | 2/2008 | Soman et al. | 24/293 |
| 2009/0056087 A1 * | 3/2009 | Arisaka | 24/455 |
| 2010/0303539 A1 * | 12/2010 | Aoki et al. | 403/291 |
| 2011/0062683 A1 * | 3/2011 | Schirm | 280/728.1 |

FOREIGN PATENT DOCUMENTS

| | | |
|---|---|---|
| JP | 2000-318657 | 11/2000 |
| JP | 2000-344042 | 12/2000 |
| JP | 2001-277985 | 10/2001 |
| JP | 2001277984 A * | 10/2001 |
| JP | 2002-37007 | 2/2002 |

OTHER PUBLICATIONS

Hosoya et al., Clip Device for Air Bag, Oct. 10, 2001, JPO, JP 2001-277985 A, Machine translation of Description.*

* cited by examiner

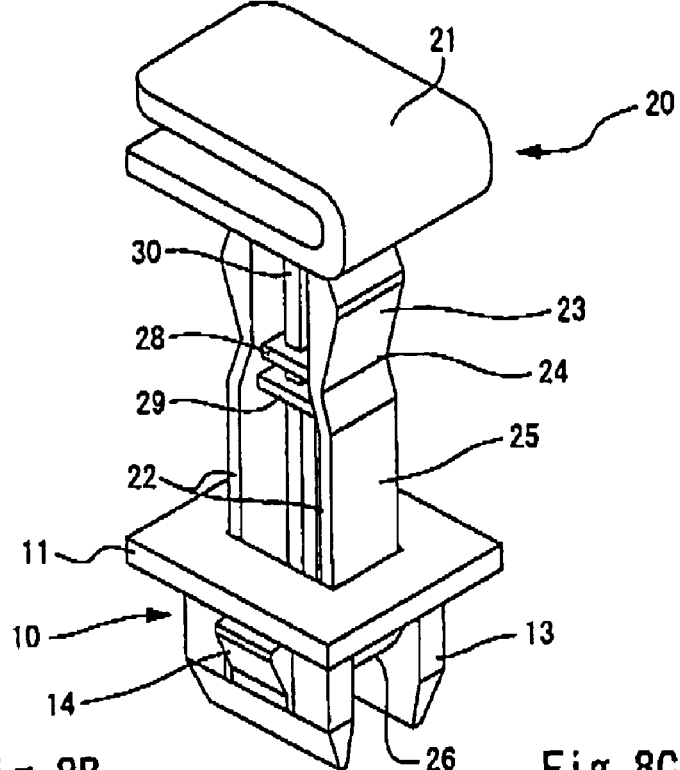
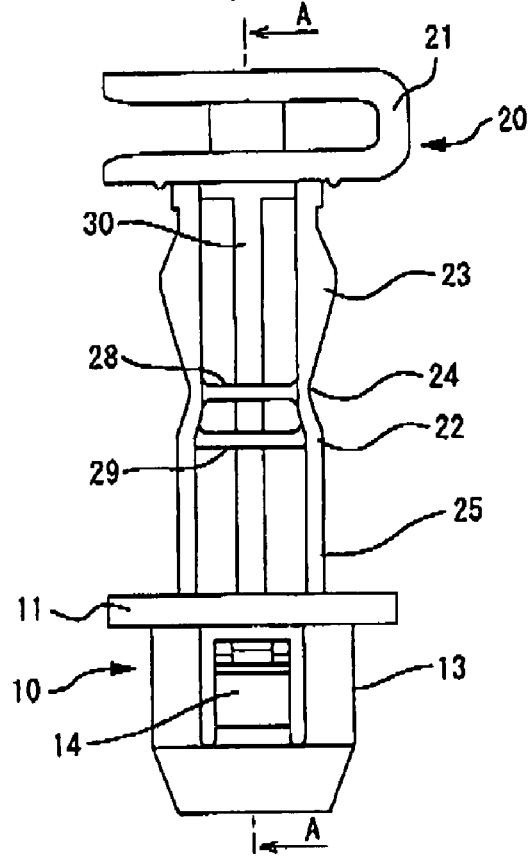 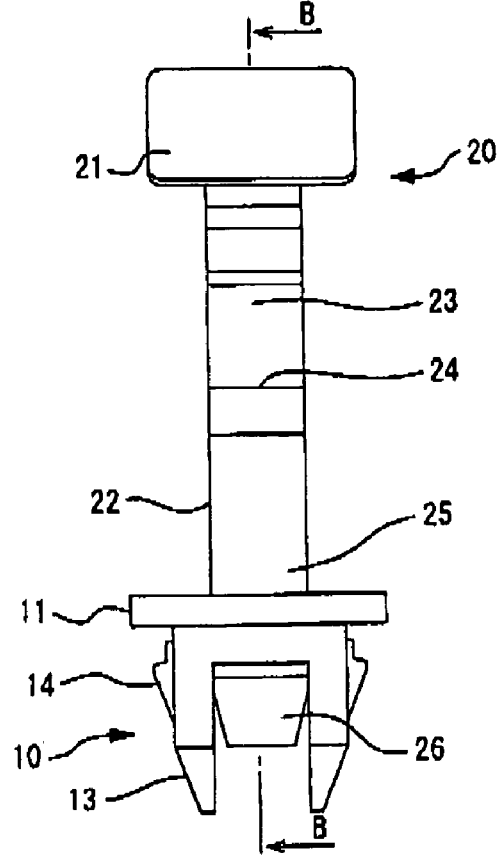

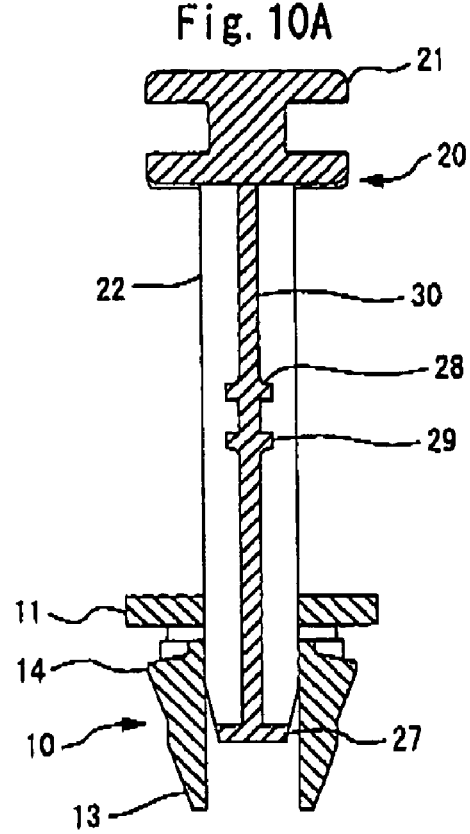
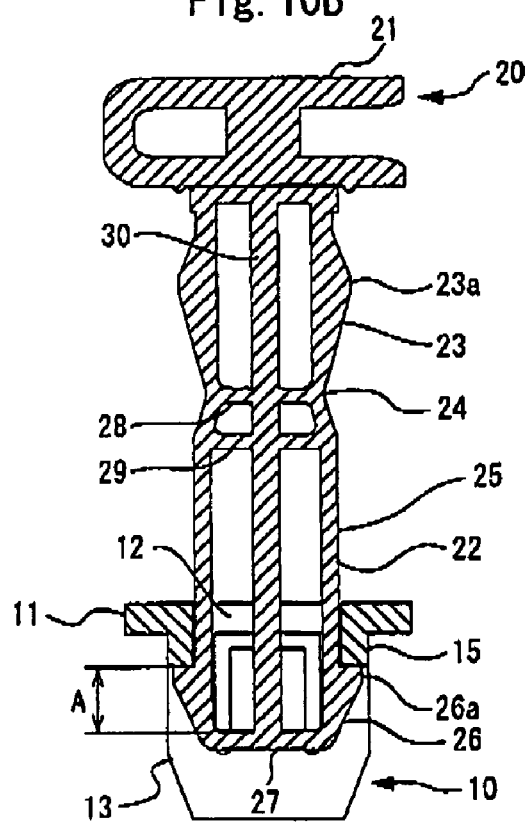

Fig. 12A
Fig. 12B
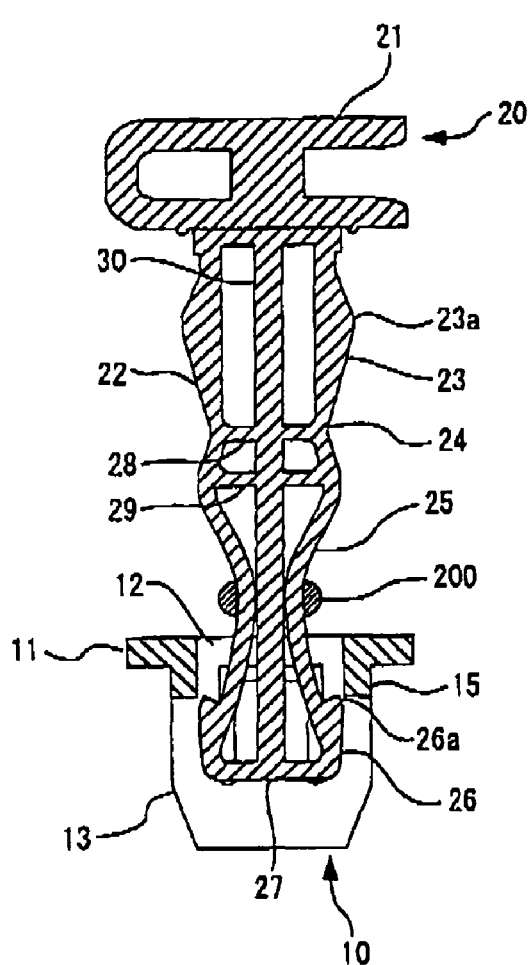
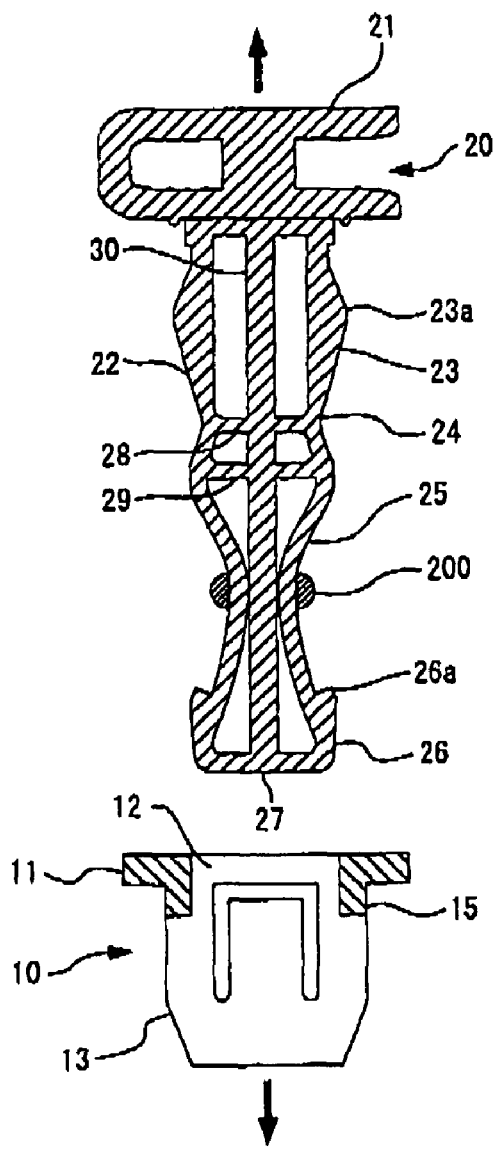

CLIP FOR AIRBAG

TECHNICAL FIELD

The present invention relates to a clip for an airbag used for attaching a garnish to a vehicle body under the condition that an airbag device is accommodated in the garnish.

BACKGROUND ART

Recently, with the object of more safely protecting a passenger from a collision caused on a side of an automobile, an airbag device (a side airbag device) has been installed on the side of the passenger compartment.

Patent Document 1 discloses a clip (holding fixture) for an airbag used for attaching a garnish to a vehicle body under the condition that the airbag device is accommodated in the garnish. As shown in FIGS. 2 and 3 of Patent Document 1 described above, this clip (holding fixture) for an airbag includes: a pin member (11); and a grommet member (12), wherein a head portion of the pin member (11) is attached to the garnish (4). A leg portion (19) of the pin member (11) is inserted into a cylindrical portion (22) of the grommet member (12). Under the condition that a first engaging pawl (16) of the leg portion (14) is engaged with a first engaging portion (25) of the cylindrical portion (22), the garnish (4) is attached to an inner panel (5). When an airbag (31) is inflated, an engagement of the first engaging pawl (16) with the first engaging portion (25) is released and a second engaging pawl (17) is engaged with a second engaging portion (26). Due to the foregoing, a gap is formed between the garnish (4) and the inner panel (5) and an airbag (31) is expanded from this gap. In this connection, reference numerals in the parentheses are the same as those described in Patent Document 1.

Patent Document 1: Official gazette of JP-2002-37007-A

DISCLOSURE OF THE INVENTION

Problems that the Invention is to Solve

At the time of maintenance, inspection or replacement of the airbag device, the garnish and the clip for an airbag are removed from a vehicle body. In the clip (holding fixture) for an airbag described in Patent Document 1, first, the garnish (4) is slid in the lateral direction and the garnish is removed from a head portion of the pin member (11). Then, when the pin member (11) is turned by the angle 45°, the second engaging pawl (17) is set at a position where it is not engaged with the second engaging portion (26). Under this condition, the pin member (11) is drawn out from the grommet member (12).

However, the garnish is a long member formed into a curved shape along a pillar and a side roof. Further, head portions of a plurality of pin members are engaged with the garnish. Therefore, it is difficult and complicated for the garnish to be released from an engagement with the pin member head portions by sliding the garnish in the lateral direction. Further, when the long garnish is slid in the lateral direction, it tends to hit the interior finish provided in the periphery of the garnish in a small passenger compartment. There is a possibility that the garnish and the other interior finish are damaged.

The present invention has been accomplished in view of the above circumstances. An object of the present invention is to provide a clip for an airbag, the pin member of which can be easily removed from a grommet by a simple operation even in a state in which a garnish is furnished.

Means for Solving the Problems

The present invention provides a clip for an airbag capable of holding a garnish at an airbag accommodating position in which the garnish is contacted with or located close to the vehicle body and an airbag is accommodated therebetween, and at an airbag expansion position in which the garnish is separated from the vehicle body and the airbag is expanded in a passenger compartment, the clip for an airbag including: a grommet and a pin member, wherein a head portion of the pin member is attached to one of the garnish and the vehicle body and the grommet is attached to the other of the garnish and the vehicle body, the grommet including: a supporting hole into which the pin member is inserted from a surface side to a back side; and an engaging portion for preventing the pin member from coming out from the supporting hole, the pin member including a pair of sidewalls opposed to each other which are extended from the head portion in the axial direction and inserted into a supporting hole of the grommet and capable of relatively moving in the axial direction with respect to the grommet, each sidewall including: a first engaging portion formed on the head portion side which is engaged with an engaging portion of the grommet and holds the garnish at the airbag accommodating position; and a second engaging portion formed on a distal portion side which is engaged with the engaging portion of the grommet and holds the garnish at the airbag expansion position, wherein each sidewall forms a flexible region in which an arbitrary region on the distal portion side of the first engaging portion can be elastically deflected inside, and under the condition that the second engaging portion is engaged with the engaging portion of the grommet, when the flexible region exposed from the supporting hole onto the surface side of the grommet is deflected inside, the second engaging portion is displaced according to the deflection of the flexible region so that an engaging state of the grommet with the engaging portion can be released.

In the present invention composed as described above, only when a tool such as a pair of pliers are inserted into a gap formed between the vehicle body and the garnish at the airbag expansion position and the sidewalls of the pin member are elastically deflected by the tool, an engagement state of the pin member with the grommet can be easily released. Therefore, even when the garnish is attached to the vehicle body as it is, the pin member can be easily removed from the grommet. Accordingly, it is possible to easily execute a maintenance and inspection work of the airbag device and it is also possible to execute a replacement work of the airbag device without damaging the garnish and the interior finish of the passenger compartment.

The pin member can be composed in such a manner that the pair of sidewalls are arranged being opposed to each other at a predetermined interval and a rib is extended in the axial direction at a central position between the sidewalls.

When a pair of sidewalls are arranged being opposed to each other through the rib, the sidewalls can be equally deflected and the pin member can be prevented from being damaged. In the case of removing the airbag device, in some cases, when the pair of sidewalls are deflected being biased to only one side, the engaging portion is caught by one of the sidewalls not deflected and there is a possibility that it becomes impossible to release an engagement of the pin member with the grommet. However, in the present invention, the rib is extended to a central position of the sidewalls.

Therefore, the sidewalls are prevented from being biased to only one side and deflected. Therefore, a state of engagement of the pin member with the grommet can be quickly released.

It is preferable that distal portions of the pair of sidewalls are connected to each other by a distal beam and that the second engaging portion is preferably an engaging pawl extended from the distal portion being formed into a tapered shape.

Since the distal portions are connected to each other by the distal beam, the second engaging portion is deflected round the fulcrum of the distal beam. Due to the above structure, at the time of expanding the airbag, the distal beam prevents the sidewalls from being deflected inside. Therefore, even when a heavy load is given from the grommet, the engaging state can be maintained. At the time of removing the pin member from the grommet, when the sidewalls are deflected, the engaging pawl is deflected inside being linked with it. Therefore, a state of engagement can be easily released.

The grommet includes a pair of leg portions, which are opposed to each other, extending in the axial direction from the back side opening edge of the supporting hole, the leg portions are engaged with one of the garnish and the vehicle body, the sidewalls can freely move in an intermediate portion, which is interposed between the leg portions, in the axial direction, and the engaging portion is formed in the periphery of the root portion of the leg portions.

When the engaging portion of the grommet is located in the periphery of the root portion of the leg portions, a moving distance from the first engaging portion to the second engaging portion of the pin member opposed to the engaging portion of the grommet can be increased. Accordingly, even when the entire length of the pin member is reduced, it is possible to ensure a sufficiently large gap between the garnish and the vehicle body at the airbag expansion position.

The flexible regions formed on the sidewalls are extended in parallel with each other so that a gap formed with an inside face of the supporting hole can be maintained narrow, and a constricted portion is formed between the flexible region and the first engaging portion.

Since a pair of sidewalls are extended in parallel with each other, at the time of expanding the airbag, the sidewalls can be guided by the supporting hole without becoming rickety. Therefore, the garnish held by the pin member can be stably separated from the vehicle body. In the garnish attaching work, a worker can be given a recognition of the position, at which the garnish is attached, by the constricted portion of the sidewall. Due to the foregoing, the worker can smoothly execute an attaching work.

It is preferable that the pair of sidewalls are connected to each other in the constricted portion by an intermediate beam.

The sidewalls can ensure a predetermined holding load with respect to the first engaging portion by the intermediate beam. Further, since the intermediate beam is arranged in the constricted portion, an elastic force of the flexible region is not obstructed by the intermediate beam.

Advantages of the Invention

In the present invention composed as described above, only when a tool such as a pair of pliers are inserted into a gap formed between the vehicle body and the garnish and the sidewalls of the pin member are elastically deflected by the tool, an engagement state of the pin member with the grommet can be easily released. Therefore, even when the garnish is attached to the vehicle body as it is, the pin member can be easily removed from the grommet. Accordingly, it is possible to easily execute a maintenance and inspection work of the airbag device and it is also possible to execute a replacement work of the airbag device without damaging the garnish and the interior finish in the passenger compartment.

BRIEF DESCRIPTION OF THE DRAWINGS

FIGS. 1A and 1B are schematic illustrations respectively showing a constitution of a side airbag of the present embodiment, wherein FIG. 1A is a view showing the side airbag at the time of normal operation and FIG. 13 is a view showing the side airbag at the time of expanding the airbag.

FIGS. 2A and 2B are perspective views respectively showing parts of a clip for an airbag of the present embodiment, wherein FIG. 2A is a view showing a pin member and FIG. 2B is a view showing a grommet.

FIGS. 3A to 3D are development views showing a grommet of a clip for an airbag of the present embodiment, wherein FIG. 3A is an upper face view, FIG. 3B is a front view, FIG. 3C is a side view and FIG. 3D is a bottom view.

FIGS. 4A and 4B are development views showing a pin member of a clip for an airbag of the present embodiment, wherein FIG. 4A is a front view and FIG. 4B is a side view.

FIGS. 5A to 5C are views showing a state of a pin member and a grommet at an airbag accommodating position in a clip for an airbag of the present embodiment, wherein FIG. 5A is a perspective view, FIG. 5B is a front view and FIG. 5C is a side view.

FIGS. 7A and 7B are sectional views showing a clip for an airbag of FIGS. 5A to 5C, wherein FIG. 7A is a sectional view taken on line A-A in FIG. 5B and FIG. 7B is a sectional view taken on line B-B in FIG. 5C.

FIGS. 8A to 8C are views showing a state of a pin member and a grommet at an airbag expansion position in a clip for an airbag of the present embodiment, wherein FIG. 8A is a perspective view, FIG. 8B is a front view and FIG. 8C is a side view.

FIGS. 10A and 10B are sectional views showing a clip for an airbag of FIGS. 8A to 8C, wherein FIG. 10A is a sectional view taken on line A-A in FIG. 8B and FIG. 10B is a sectional view taken on line B-B in FIG. 8C.

FIGS. 12A and 12B are sectional views showing a clip for an airbag in a state of FIG. 11, wherein FIG. 12A is a view showing the clip at the time of deflecting a flexible region and FIG. 12B is a view showing the clip at the time of separating the clip from the grommet.

FIGS. 13A and 13B are sectional views for explaining a function of a rib provided in an intermediate portion of each sidewall, wherein FIG. 13A is a view showing a case in which a pin member having no rib in the intermediate portion is deflected, FIG. 13B is a view showing a pin member having a rib in the intermediate portion and FIG. 13C is a view showing a case in which the pin member of FIG. 13B is deflected.

FIGS. 14A and 14B are views showing a variation of a clip for an airbag of the present invention, wherein FIG. 14A is a perspective view showing a pin member and FIG. 14B is a sectional view showing a sidewall of FIG. 14A.

FIGS. 15A and 15B are perspective views showing a variation of a clip for an airbag of the embodiment described above, wherein FIG. 15A is a view showing a pin member and FIG. 15B is a view showing a grommet.

DESCRIPTION OF THE REFERENCE NUMERALS AND SIGNS

Figure 1A:
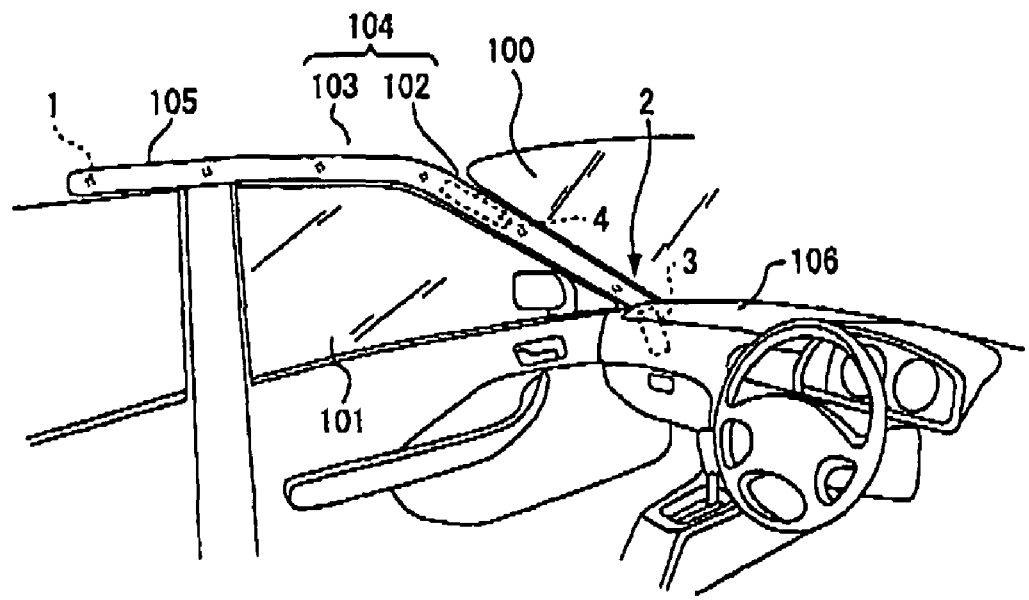

1: Clip for airbag
2: Side airbag device
3: Inflator
4: Airbag
10: Grommet
11: Flange portion
12: Supporting hole
13: Leg portion
14: Attaching-hole-engaging portion
15: Engaging portion
20: Pin member
21: Head portion
22: Sidewall
23: First engaging portion
24: Constricted portion
25: Flexible region
26: Second engaging portion
27: Distal beam
28: Upper intermediate beam
29: Lower intermediate beam
30: Rib
100: Windshield
101: Side windowpane
102: Front pillar
103: Roof side
104: Vehicle body
105: Garnish
106: Instrument panel
200: Pliers

BEST MODE FOR CARRYING OUT THE INVENTION

Referring to the drawings, an embodiment of the present invention will be explained in detail as follows.

Figure 1B:
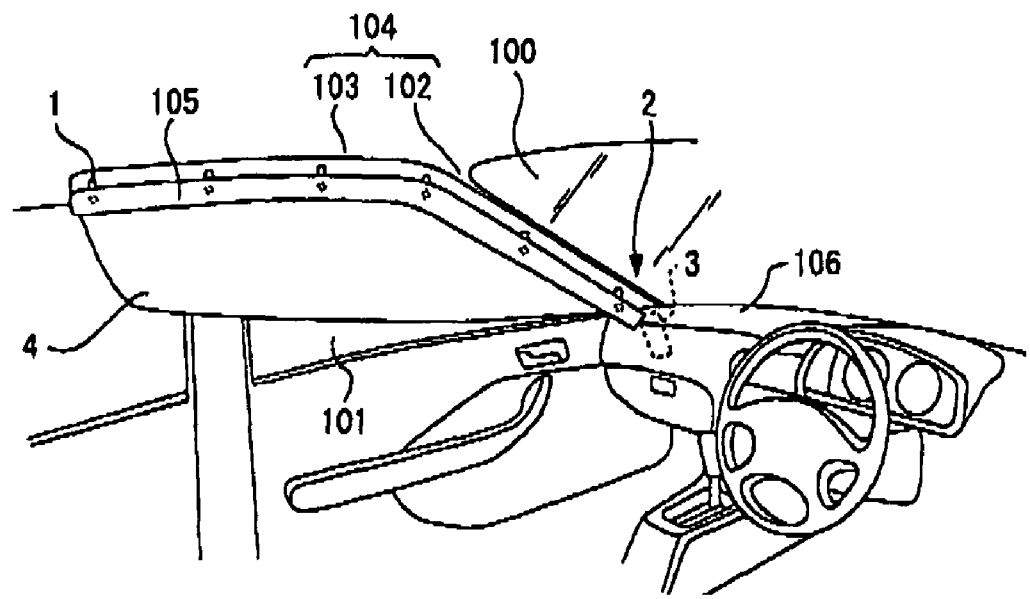

FIGS. 1A to 13C are views for explaining a constitution of a clip for an airbag of an embodiment of the present invention. FIGS. 1A and 1B are schematic illustrations respectively showing a constitution of a side airbag of the present embodiment.

The clip 1 for an airbag of the present embodiment is used for making a side airbag device (or a curtain airbag device) 2 function in a passenger compartment of an automobile. As shown in FIG. 1A, the side airbag device 2 is provided along the front pillar 102 and the roof side 103 between the windshield 100 and the side windowpane 101. The front pillar 102 and roof side 103, which will be referred to as a vehicle body 104 hereinafter, are furnished with the garnish 105, which is referred to as an interior finish martial, a cover material or a trim material, for covering the airbag 4 so as to finish the interior of the passenger compartment.

The side airbag device 2 includes a sensor (not shown), an inflator 3 and an airbag 4. At the time of a car collision, the airbag 4 is expanded. The sensor of the side airbag 2 is arranged at a predetermined position on the side of a vehicle body and detects an acceleration and a load. When this sensor detects an acceleration or a load higher than a predetermined value, the inflator 3 is operated.

The inflator 3 of the side airbag device 2 has a function of supplying gas to the airbag 4 and is arranged in the instrument panel 106 on the front side or in the quarter pillar (not shown).

When the sensor detects an acceleration or a load, this inflator 3 is operated in such a manner that gas is spouted out into the airbag 4 accommodated in the garnish 105 so that the airbag 4 can be inflated. Due to the foregoing the airbag 4 pushes out the garnish 105 and the airbag 4 can be expanded onto the side of the passenger compartment. Concerning this matter, refer to FIG. 1B.

The clip 1 for an airbag of the present embodiment has a function of operating the side airbag device 2 described above. That is, the clip 1 for an airbag is formed so that it can hold the garnish 105 at an airbag accommodating position, at which the garnish 105 is contacted with the vehicle body 109 or the garnish 105 comes close to the vehicle body 104, and at an airbag expansion position at which the garnish 105 is separated from the vehicle body 104 and the airbag 4 is expanded in the passenger compartment.

Figure 2A:
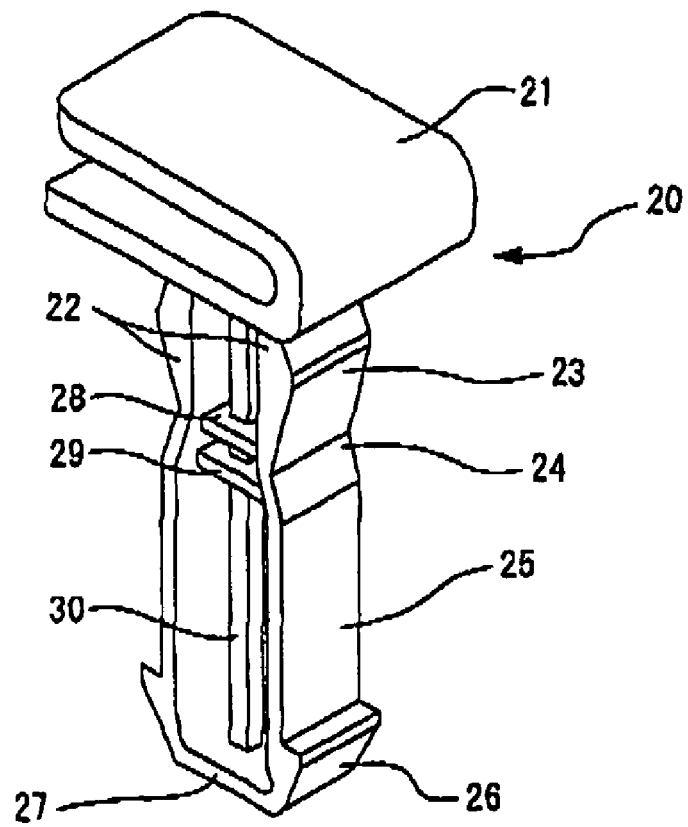
Figure 2B:
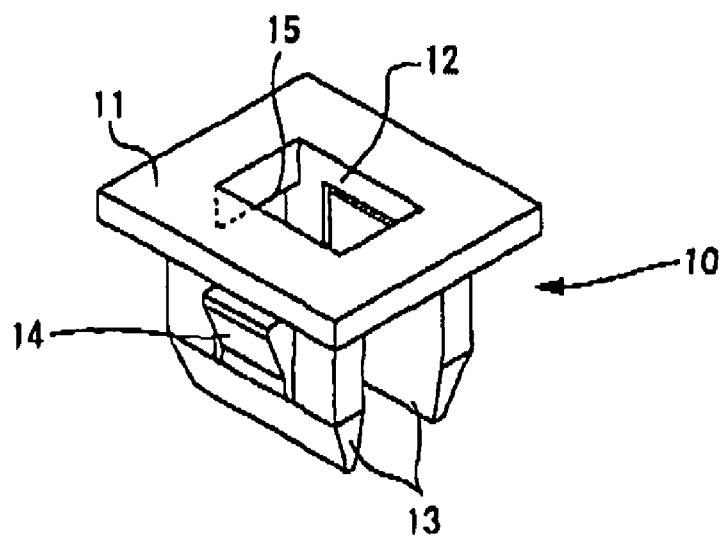

FIGS. 2A and 2B are perspective views respectively showing parts of a clip for an airbag of the present embodiment. FIG. 2A is a view showing a pin member and FIG. 2B is a view showing a grommet.

As shown in FIGS. 1A to 2B, the clip 1 for an airbag includes: a grommet 10, the main body of which is attached to the vehicle body 104; and a pin member 20, the head portion 21 of which is attached to the garnish 105. The grommet 10 and the pin member 20 are integrally formed out of synthetic resin, the rigidity of which is high.

Figure 3A:
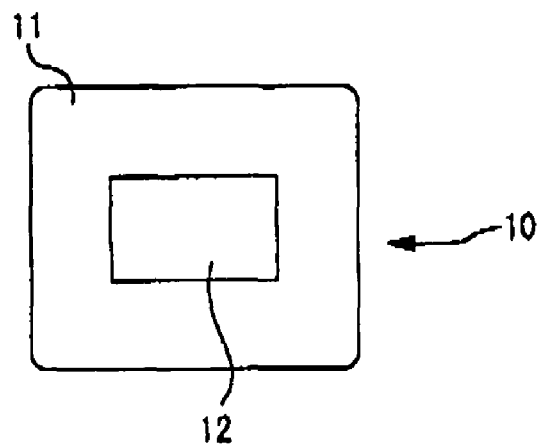
Figure 3B:
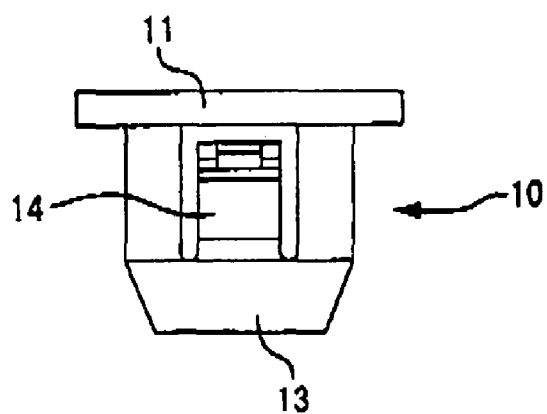
Figure 3C:
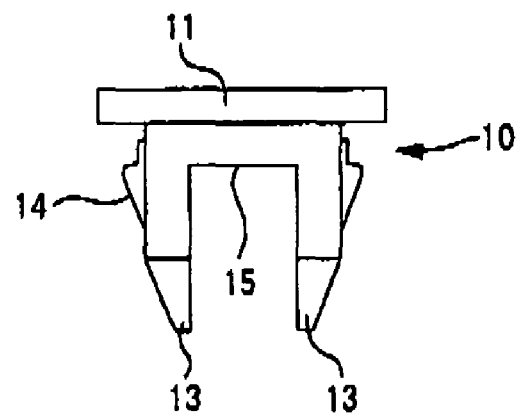
Figure 3D:
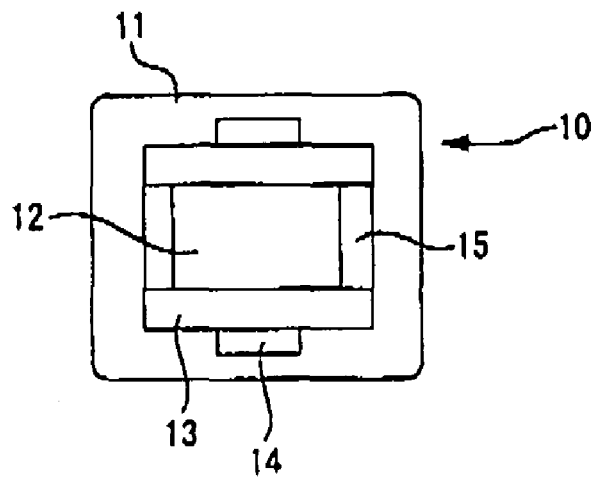

FIGS. 3A to 3D are development views showing a grommet of a clip for an airbag of the present embodiment, wherein FIG. 3A is an upper face view, FIG. 3B is a front view, FIG. 3C is a side view and FIG. 3D is a bottom view. As shown in FIGS. 2A to 3D, the grommet 10 of the clip 1 for an airbag has a flange portion 11 coming into contact with a peripheral edge of an attaching hole (not shown) of the vehicle body 104. At a central position of this flange portion 11, the supporting hole 12 is formed, into which the pin member 20 is inserted from the surface side to the back side.

In the grommet 10, on the reverse side of the flange portion 11, a pair of leg portions 13, which are opposed to each other, are extended in the axial direction from a reverse side opening edge of the supporting hole 12. In the central portion on the side of this leg portion 13, the attaching-hole-engaging portion 14 is provided in which a tapered protruding portion extending in the opposite direction to the extending direction of the leg portion 13 is formed. In the case where the grommet 10 is attached to the vehicle body 104, the protruding portion of this attaching-hole-engaging portion 14 is engaged with the attaching hole of the vehicle body 104 so that the grommet 10 can be held in the attaching hole concerned. In the case where the grommet 10 is removed from the vehicle body 104, the attaching-hole-engaging portion 14, which is deflected inside in the supporting hole 12, is hooked by a minus driver and deflected further inside. In this way, an engagement of the grommet 10 with the attaching hole can be easily released.

In the grommet 10, the engaging portion 15 for preventing the pin member 20 from coming out from the supporting hole 12 is formed in the periphery of the leg portion 13. The pin member 20 described later is composed in such a manner that it is inserted into the supporting hole 12 of the grommet 10 and engaged with this engaging portion 15. In this connection, the engaging portion 15 of the present embodiment is connected to a pair of leg portions 13 which are protruded from an opening edge on the back side of the supporting hole 12 by a predetermined length. Therefore, the engaging portion 15 of the present embodiment functions as a rib for regulating a deflection of the leg portion 13.

Figure 4A:
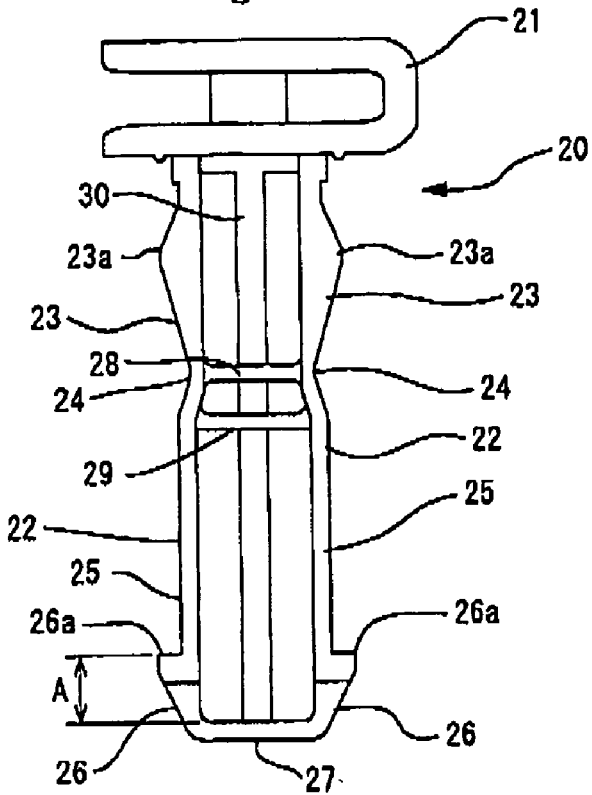
Figure 4B:
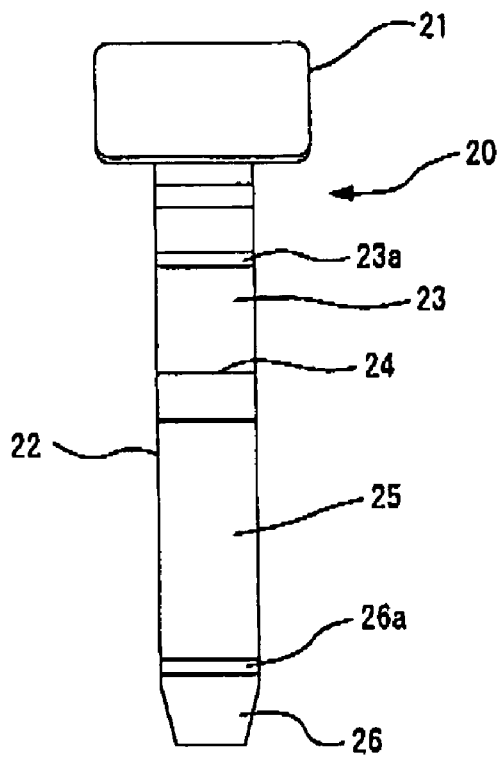

FIGS. 4A and 4B are development views showing a pin member of a clip for an airbag of the present embodiment, wherein FIG. 4A is a front view and FIG. 4B is a side view.

As shown in FIGS. 2A, 2B, 4A and 4B, the pin member 20 of the clip 1 for an airbag includes: a head portion 21 to be attached to an attaching seat (not shown) of the garnish 105; and a pair of sidewalls 22, which are opposed to each other, extending from the back side of this head portion 21 in the axial direction. In the head portion 21 of the pin member 20, a substantially bracket-shaped flange is formed. When the attaching seat of the garnish 105 is inserted into an opening portion of this bracket-shape opening portion, the garnish 105 can be held.

On the other hand, a pair of sidewalls 22 extending in the axial direction are inserted into the supporting hole 12 of the grommet 10 and arranged being opposed to each other while making a predetermined interval. The first engaging portion 23, the constricted portion 24, the flexible region 25 and the second engaging portion 26 are formed in this order from the head portion 21 side on the sidewall 22.

The first engaging portion 23 is formed in such a manner that a portion from the root portion of the head portion 21 to the constricted portion 24 is curved through the top portion 23a when the thickness of the sidewall 22 is changed. A pair of the first engaging portions 23 are engaged with the engaging portion 15 of the grommet 10 so that the garnish 105 can be held in the airbag accommodating portion. The first engaging portion 23 is composed so that it can be elastically deflected inside and an engaging state can be released when a predetermined load (for example, a load from 11 to 19 kg) is given to the first engaging portion 23. In this connection, a shape of the first engaging portion 23 may be arbitrarily designed so as to obtain a predetermined load in the engaging state of the grommet 10 with the engaging portion 15.

The constricted portion 24 of the sidewall 22 is formed between the flexible region 25 and the first engaging portion 23. The constricted portion 24 is the thinnest portion on the sidewall 22. This constricted portion 24 is provided in order for the first engaging portion 23 to obtain a predetermined load. At the same time, this constricted portion 24 is provided so as to give a recognition of the attaching position to a worker in the attaching work of the garnish 105. Due to the recognition of this constricted portion 24, the worker can smoothly execute an attaching work.

The flexible region 25 of the sidewall 22 is formed being extended in parallel from the constricted portion 24 to the second engaging portion 26. This flexible region 25 is a region capable of being elastically deflected inside. An amount of extension of this flexible region 25 is appropriately determined by an expansion amount of the airbag 4. The flexible region 25 is extended so that a gap with the inside of the supporting hole 12 of the grommet 10 can be maintained small. At the time of expanding the airbag, this flexible region guides the sidewall 22 so that the sidewall 22 can not become rickety in the supporting hole 12 of the grommet 10. Due to the foregoing, the garnish 105 held by the pin member 20 can be stably separated from the vehicle body 104.

Distal portions of the pair of sidewalls 22 are connected to each other by the distal beam 27. The second engaging portion 26 is integrally formed on an outer face of the flexible region 25 of the sidewall 22. Specifically, the second engaging portion 26 has a size A in length and is provided on an outer face of the flexible region 25 being formed into a tapered shape directed from a connecting portion with the distal beam 27 to the first engaging portion 23. An end face on the first engaging portion 23 side is formed into the engaging pawl 26a. The engaging pawl 26a of the second engaging portion 26 is engaged with the engaging portion 15 of the grommet 10 and holds the garnish 105 at the airbag expansion position. Therefore, the engaging pawl 26a is composed so that it can hold an engaging state even when the first engaging portion 23 is given a load not less than a predetermined value. Due to the foregoing, even when the airbag 4 is inflated, the clip for an airbag can hold the garnish 105.

As described above, the second engaging portion 26 is integrally formed on the outer face of the flexible region 25 in the range of the size A. Therefore, when the flexible region 25 is deflected inside, the engaging pawl 26a of the second engaging portion 26 is also deflected inside round the fulcrum of the connecting portion (the distal portion) of the distal beam 27. Due to the foregoing, an engaging state with the engaging portion 15 of the grommet 10 can be easily released.

Figure 5A:
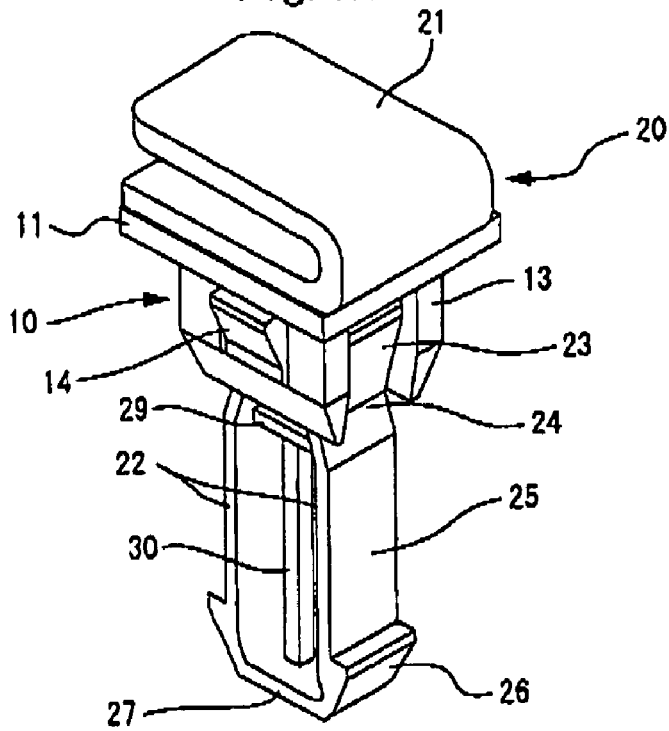
Figure 5B:
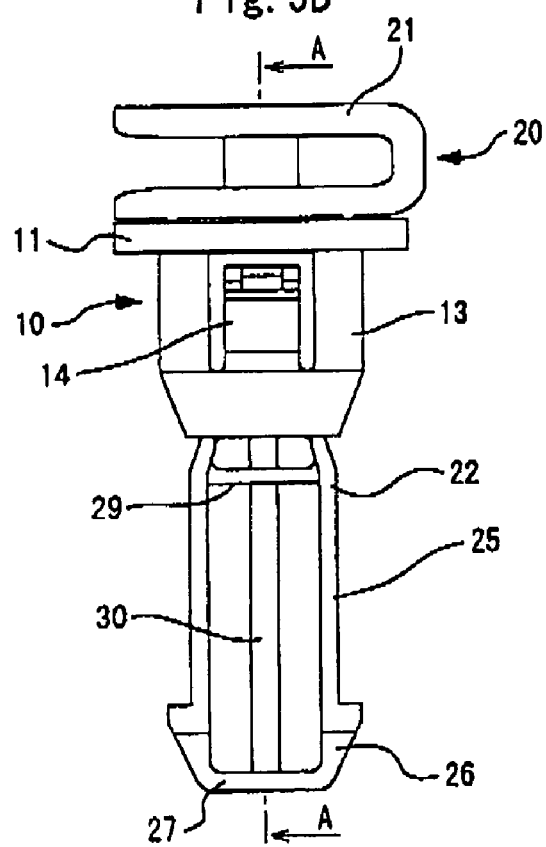
Figure 5C:
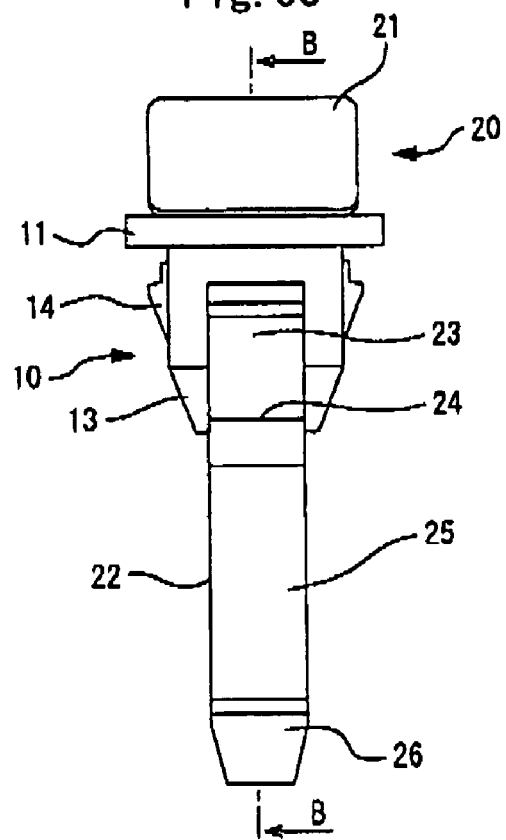
Figure 6:
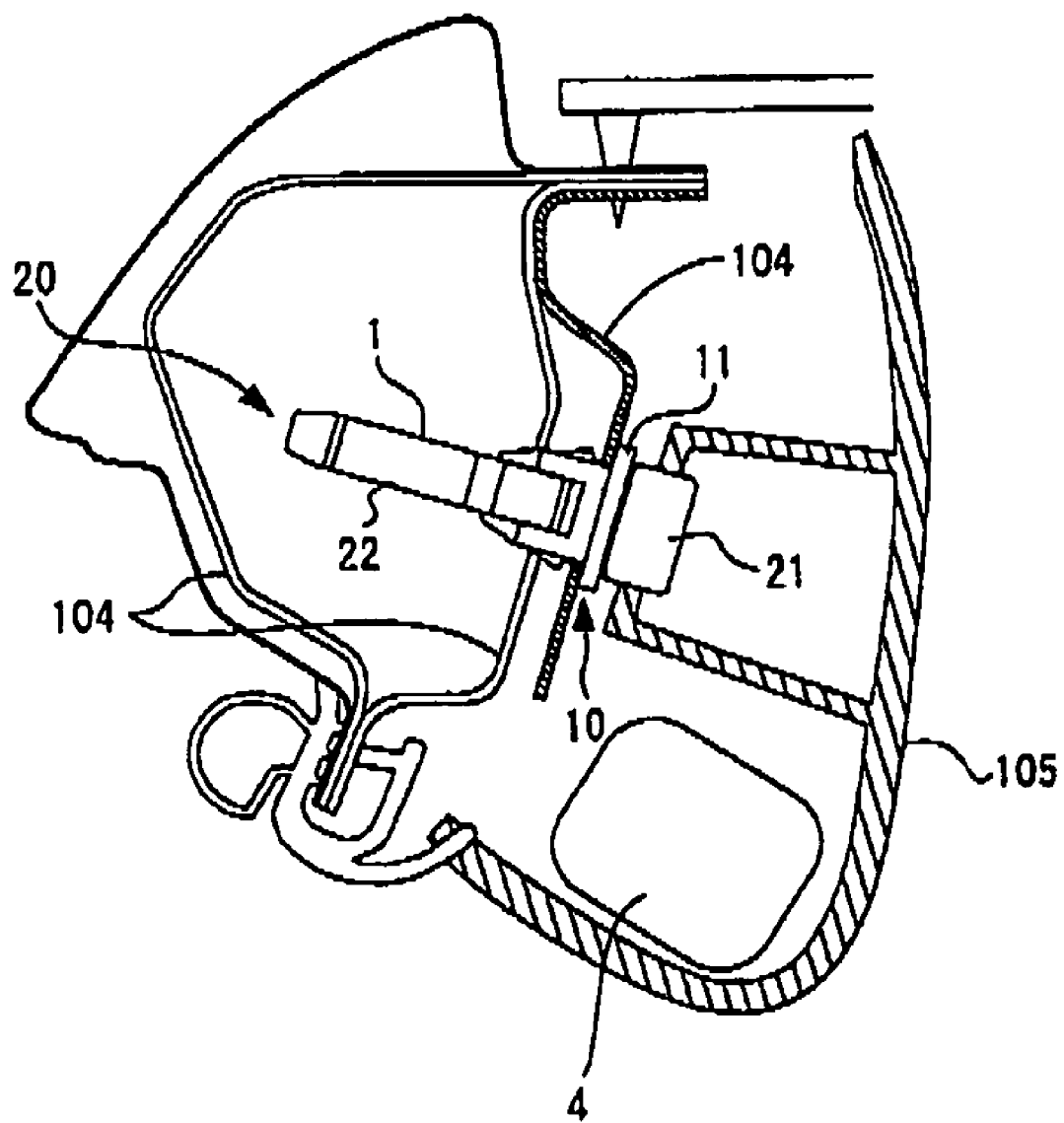
FIG. 6 is a sectional side view including a vehicle body and a garnish showing a state of FIGS. 5A to 5C.
Figure 7A:
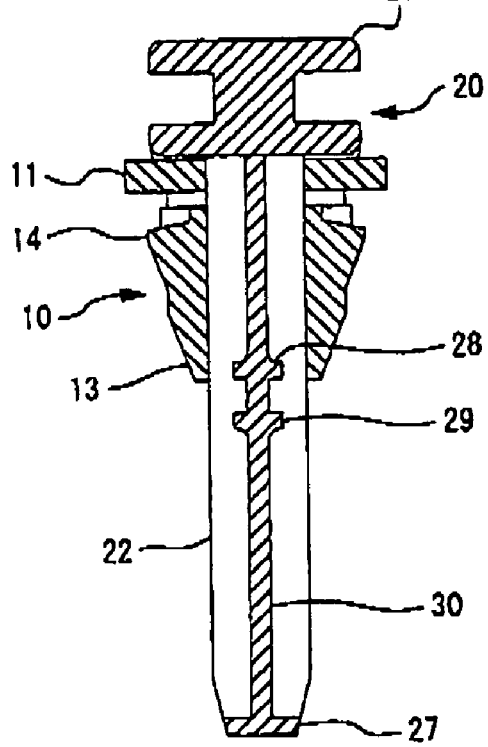
Figure 7B:
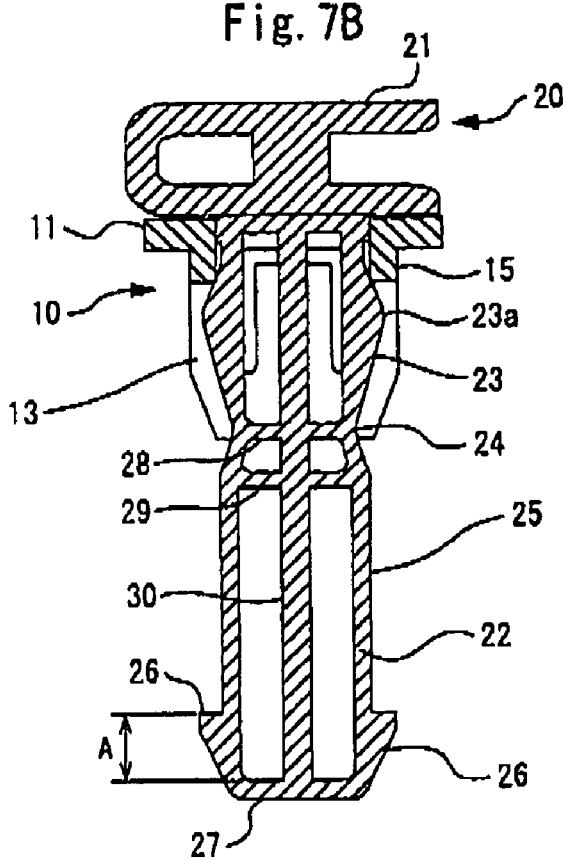

FIGS. 5A to 5C are views showing a state of a pin member and a grommet at an airbag accommodating position in a clip for an airbag of the present embodiment. FIG. 6 is a sectional side view including a vehicle body and a garnish showing a state of FIGS. 5A to 5C. FIGS. 7A and 7B are sectional views showing a clip for an airbag of FIGS. 5A to 5C.

The clip 1 for an airbag is applied to an automobile provided with the side airbag device 2 as follows. First, the sidewall 22 of the pin member 20 is inserted into the supporting hole 12 of the grommet 10 and the pin member 20 is relatively moved in the axial direction to the first engaging portion 23 of the sidewall 22. Further, as shown in FIGS. 5 to 7, when the first engaging portion 23 is engaged with the engaging portion 15, an engaging state is made in which the pin member 20 is held by the grommet 10. After that the head portion 21 of the pin member 20 is attached to an attaching seat of the garnish 105. In this state, the garnish 105 is moved and the exposed grommet 10 is attached to an attaching hole of the vehicle body 104. In this way, the garnish 105 is arranged at the airbag accommodating position.

At this airbag accommodating position, an outer edge of the garnish 105 comes into contact with the vehicle body 104 and the accommodated airbag 4 is put into a closed state. The sidewall 22 of the pin member 20, which has been inserted into the grommet 10, is protruded into a hollow portion in the vehicle body 104.

At this airbag accommodating position, when the top portions 23a of the pair of first engaging portions 23 are hooked at the engaging portion 15 of the grommet 10, the pin member 20 is held by the grommet 10. In this case, holding forces of both engaging portions 15, 23 in the engaging state are decided by an elastic force of the first engaging portion 23. In this connection, in the clip 1 for an airbag of the present embodiment, the upper intermediate beam 28 for connecting a pair of sidewalls 22 is provided at the position of the constricted portion 24. This upper intermediate beam 28 can ensure a predetermined load with respect to the flexibility of the first engaging portion 23 provided on the sidewall 22.

Figure 9:
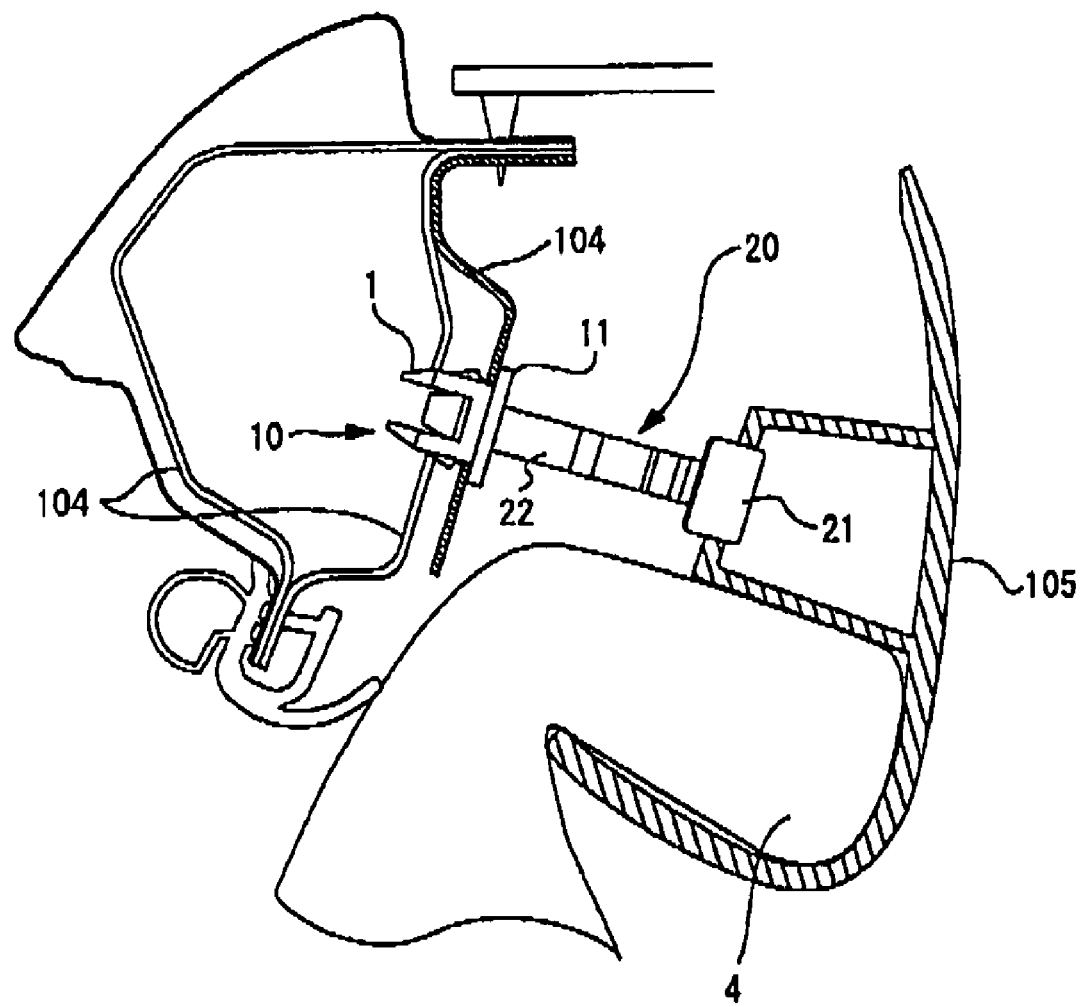
FIG. 9 is a sectional side view including a vehicle body and a garnish showing a state of FIG. 8A to 8C.

FIGS. 8A to 8C are views showing a state of a pin member and a grommet at an airbag expansion position in a clip for an airbag of the present embodiment. FIG. 9 is a sectional side view including a vehicle body and a garnish showing state of FIG. 8A to 8C. FIGS. 10A and 10B are sectional views showing a clip for an airbag of FIGS. 8A to 8C.

In the case of a side collision of an automobile, the airbag 4 is inflated and the garnish 105 is pushed up. Therefore, the clip 1 for an airbag, which holds the garnish 105 at the airbag accommodating position in an engaging state of the first engaging portion 23 with the engaging portion 15, is given a load not less than a predetermined value and the engaging state is released. Due to the foregoing, the sidewall 22 is relatively moved being guided by the supporting hole 12 of the grommet 10. Accordingly, as shown in FIGS. 8A to 10B, the second engaging portion 26 is newly engaged with the engaging portion 15.

In the side airbag 2, when the pin member 20 is relatively moved with respect to the grommet 10, the garnish 105 is pushed open and separated from the vehicle body 104. Therefore, the airbag 4 is expanded on the side of a passenger compartment. Due to the foregoing, at the time of a side collision, the head portion of a passenger of the automobile can be effectively protected.

At this airbag expansion position, when the engaging pawls 26a of a pair of second engaging portions 26 are hooked at the engaging portion 15, the pin member 20 is held by the grommet 10. In this case, holding forces of both the engaging portions 15, 26 are sufficiently stronger than the holding force by the first engaging portion 23. In the clip 1 for an airbag of the present embodiment, the lower intermediate beam 29 for connecting a pair of sidewalls 22 is provided on the side of the head portion 21 of the flexible region 25 of the pin member 20. This lower intermediate beam 29 supports the flexible region 25 of the sidewall 22. Due to the above structure, the sidewall 22 can obtain a predetermined elastic force.

In this connection, a gap between the garnish 105 and the vehicle body 104 at the airbag expansion position is set by the interval from the first engaging portion 23 of the pin member 20 to the second engaging portion 26 and by the thickness of the supporting hole 12 of the grommet 10 and the engaging portion 15. In the clip 1 for an airbag of the present embodiment, the first engaging portion 23 of the pin member 20 is formed on the head portion 21 side and the second engaging portion 26 is formed on the distal side and further the engaging portion 15 of the grommet 10 is formed in the neighborhood of the leg portion 13. Therefore, a gap between the garnish 105 and the vehicle body 104 can be sufficiently widened and the airbag 4 can be stably expanded.

Figure 11:
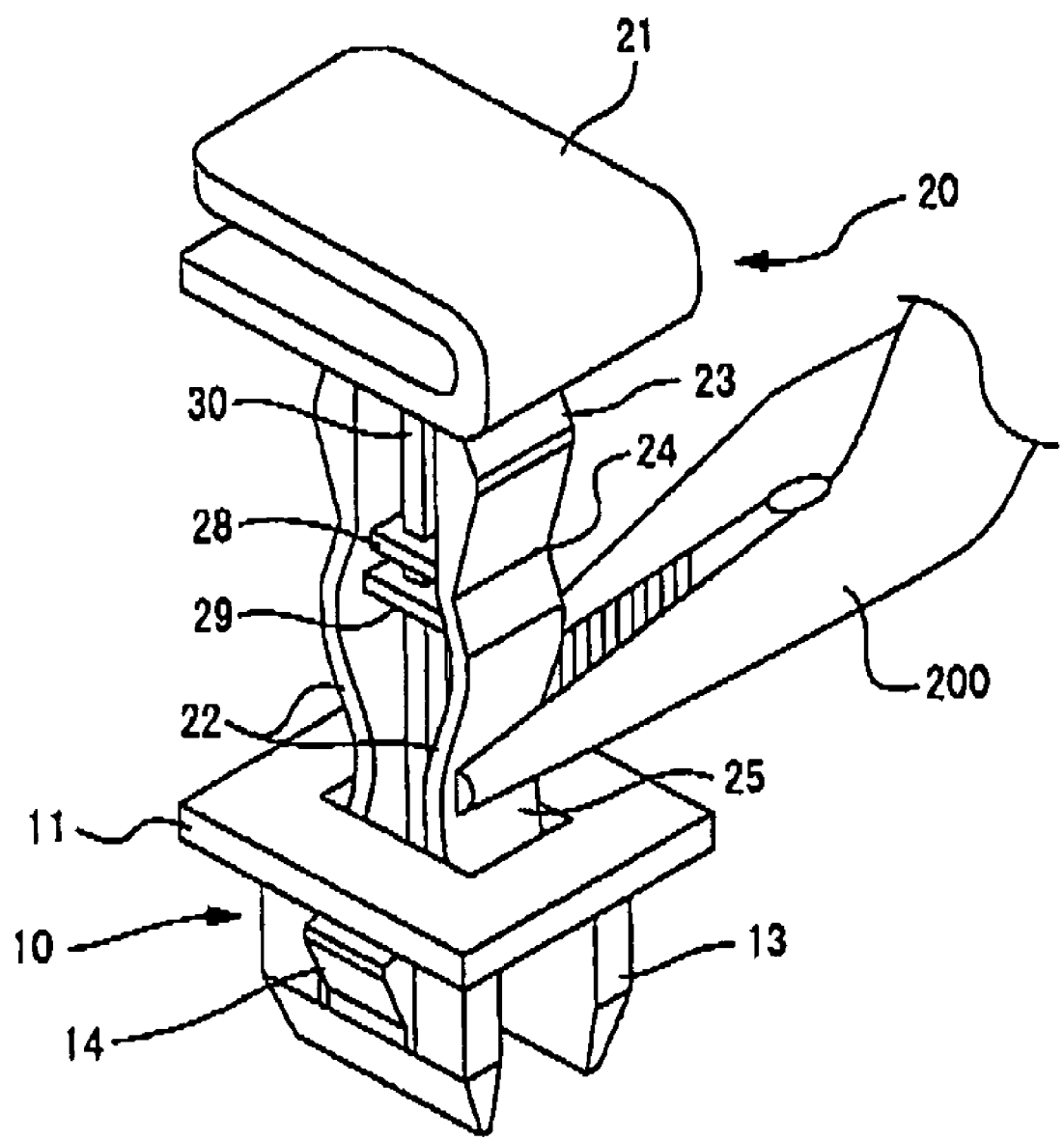
FIG. 11 is a perspective view showing a releasing operation of releasing an engaging state of a pin member and a grommet at an airbag expansion position in a clip for an airbag of the present embodiment.

FIG. 11 is a perspective view showing a releasing operation of releasing an engaging state of a pin member with a grommet at an airbag expansion position in a clip for an airbag of the present embodiment. FIGS. 12A and 12B are sectional views showing a clip for an airbag in a state of FIG. 11.

In the case where the garnish 105 is removed from the vehicle body 104 for the reasons of maintenance and so forth, as shown in FIGS. 11, 12A and 12B, the garnish 105 can be removed when the flexible region 25 of the pin member 20 of the clip 1 for an airbag is deflected at the airbag expansion position.

The specific procedure of removing the garnish 105 from the vehicle body 104 is described as follows. First, the garnish 105 is separated from the vehicle body 104 so that the airbag expansion position can be attained at which the second engaging portion 26 of the pin member 20 and the engaging portion 15 of the grommet 10 can be engaged with each other. At this time, at the airbag expansion position, the flexible region 25 of the pin member 20 is exposed to a surface side from the supporting hole 12 of the grommet 10.

After that, from a gap formed between the vehicle body 104 and the garnish 105, distal portions of the pliers 200 are inserted and the exposed flexible region 25 of the pin member is pinched by the pliers 200 and deflected inside. Concerning this matter, refer to FIG. 12A. The second engaging portion 26, which is formed integrally with the flexible region 25 of the pin member 20, is also deflected so that the engaging pawl 26a can be moved inside round the fulcrum of the connecting portion (the distal portion) of the distal beam 27. Due to the foregoing, a state of engagement of the engaging pawl 26a with the engaging portion 15 of the grommet 10 is released. Therefore, the pin member 20 and the grommet 10 are separated from each other. Accordingly, the garnish 105 can be removed from the vehicle body 104. Concerning this matter, refer to FIG. 12B.

Figure 13A:
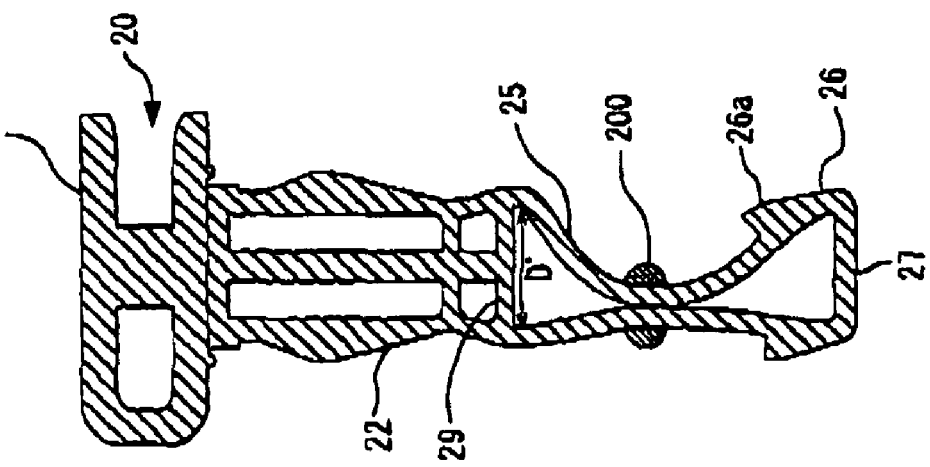
Figure 13B:
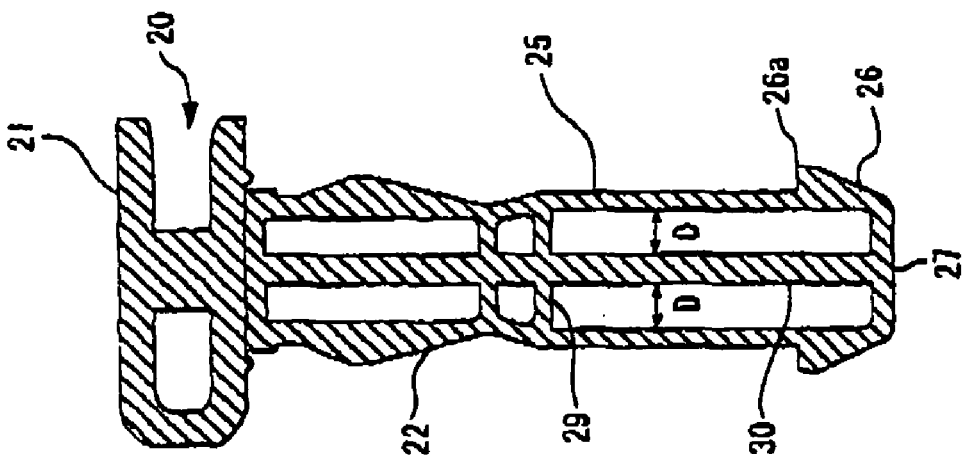
Figure 13C:
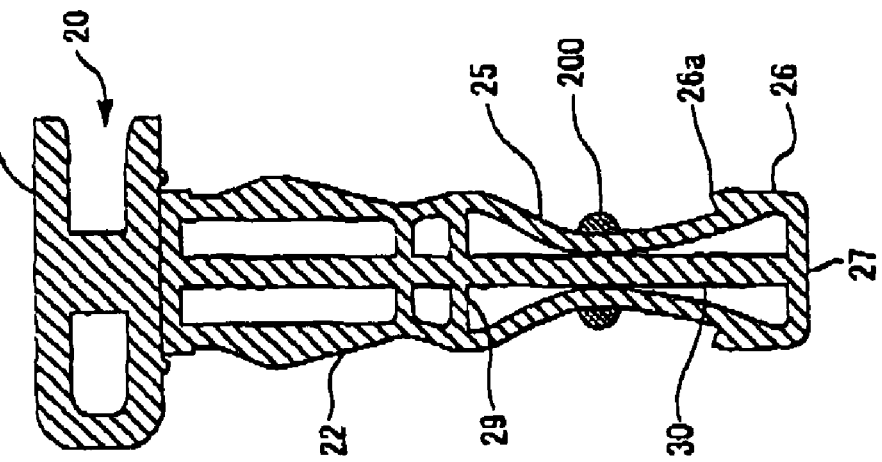

FIGS. 13A to 13C are sectional side views for explaining a function of a rib in a clip for an airbag of the present embodiment.

As shown in FIG. 13A, in the case where a pair of sidewalls 22 are only formed in parallel with each other while making an interval D' and no intermediate rib is formed, at the time of deflecting the flexible region 25 with the pliers 200, the deflection is biased onto one sidewall 22 in some cases. The above bias of the sidewall 22 is affected by the fluctuation of thickness, by the fluctuation of hardness caused by a difference in the cooling speed of resin and by the way of giving a force with the pliers 200. In the case where one of the sidewalls 22 is deflected being biased, the engaging pawl 26a of the second engaging portion 26 formed on the other sidewall 22, the amount of deflection of which is small, is not released from the engaging portion 15.

Therefore, in the pin member 20 of the clip 1 for an airbag of the present embodiment, as shown in FIG. 13B, the rib 30 extending in the axial direction is provided at the central position between the pair of sidewalls 22. The interval D between each sidewall 22 and the rib 30 is the same. When the sidewalls 22 are pinched by the pliers 200 and deflected inside, the respective sidewalls 22 are deflected until they come into contact with the rib 30.

As shown in FIG. 13C, in a state in which the sidewalls 22 come into contact with the rib 30, an amount of deflection of each sidewall 22 is D, that is, both the right and the left sidewall are equally deflected. Therefore, both the engaging pawls 26a of the second engaging portion 26 formed on the sidewalls 22 are equally deflected and released from the engaging portion 15. Due to the foregoing, a state of engagement of the pin member 20 with the grommet 10 can be quickly released. Further, it becomes possible to prevent the pin member 20 from being damaged.

After the pin member 20 and the grommet 10 have been separated from each other, when the pliers 200 are separated from the flexible region 25 of the pin member 20, the flexible region 25 is elastically returned to the original state. Accordingly, when the garnish 105 is attached to the vehicle body 104 again, the same clip 1 for an airbag can be reused.

As described above, when the clip 1 for an airbag of the present embodiment is used, a state of engagement of the pin member 20 with the grommet 10 can be easily released and the garnish 105 can be easily removed from the vehicle body 104. The garnish 105 can be more easily removed from the vehicle body 104 than a case in which the garnish 104 is slid in parallel and removed from the vehicle body 104. Accordingly, the efficiency of removing the garnish 104 can be enhanced. By releasing the state of engagement of the pin member 20 with the grommet 10, the garnish 105 can be detached from the vehicle body 104 without sliding. Therefore, it is possible to prevent the garnish 105 from colliding against the interior furnish. Accordingly, there is no possibility that the garnish 105 and the interior furnish in the passenger compartment are damaged.

Figure 14A:
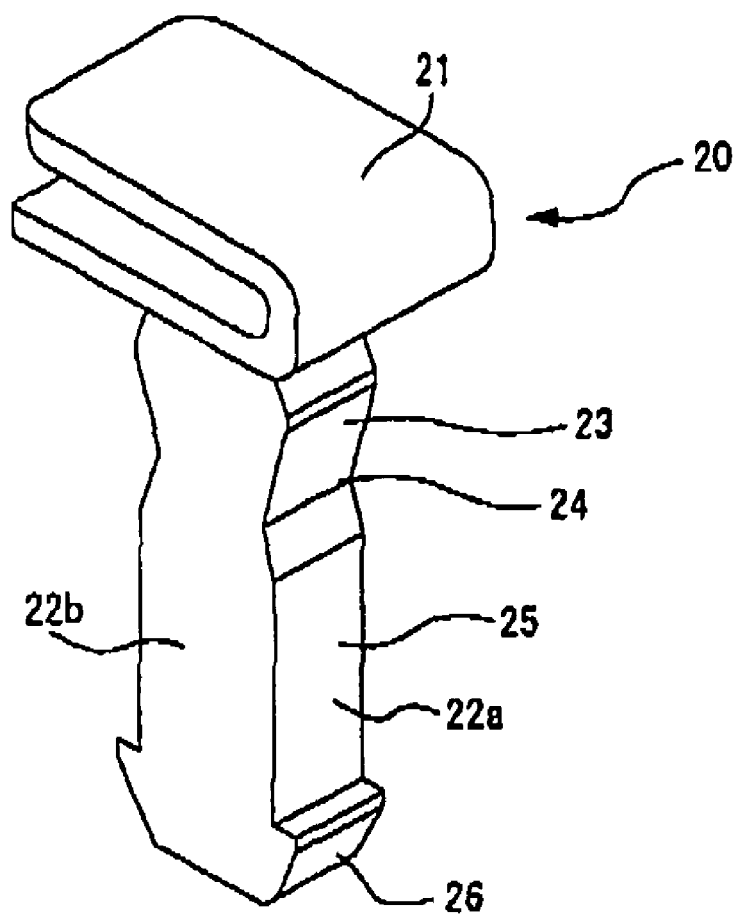
Figure 14B:
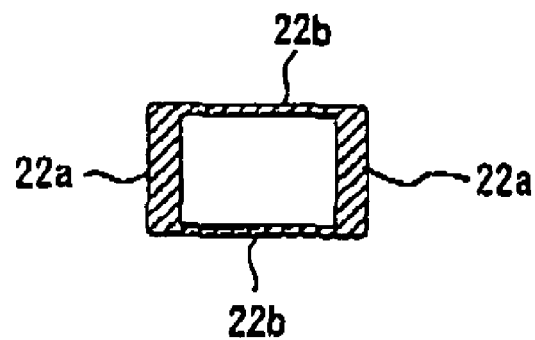

In this connection, of course, the present invention is not limited to the above specific embodiment. Variations can be made. For example, as shown in FIGS. 14A and 14B, the pin member 20 may be formed into a shape in which two pairs of sidewalls 22a, 22b opposed to each other are arranged in square on the back side of the head portion 21 and extended in the axial direction. Even in this shape, the sidewalls 22a can be elastically deflected and have the same function as that of the above embodiment.

Variation

Figure 15A:
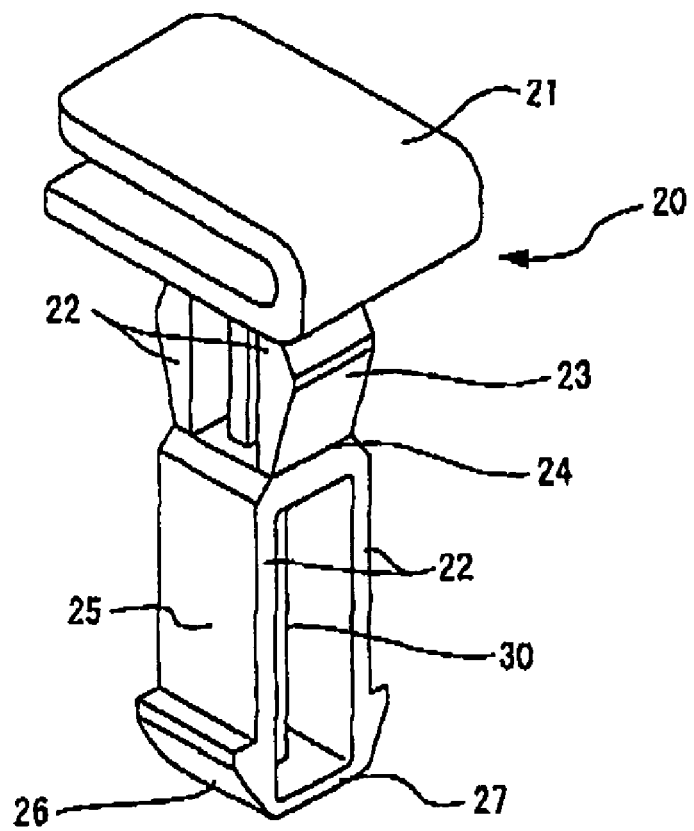
Figure 15B:
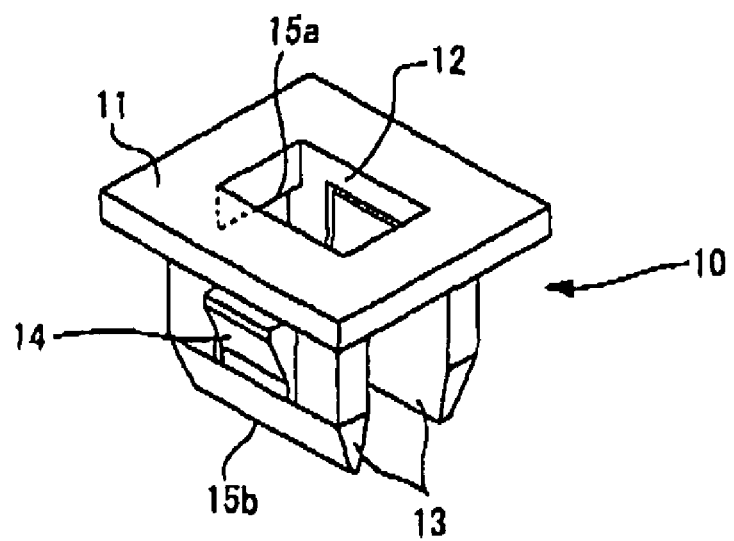

FIGS. 15A and 15B are perspective views showing a variation of a clip for an airbag of the embodiment described above, wherein FIG. 15A is a view showing a pin member and FIG. 15B is a view showing a grommet.

In the embodiment described above, both the first and the second engaging portion 23, 26 are engaged with one engaging portion 15 of the grommet 10. However, the present invention is not limited to the above specific embodiment. The engaging portions 23, 26 may be respectively engaged with engaging portions different from each other.

For example, as shown in FIGS. 15A and 15B, in the pin member 20, the first engaging portion 23 and the second engaging portion 26 are respectively formed on different sides. In the grommet 10, the first engaging portion 15a may be formed at a position opposed to the first engaging portion 23 of the pin member 20 and the second engaging portion 15b may be formed at a position opposed to the second engaging portion 26 of the pin member 20.

The invention claimed is:

1. A clip for an airbag capable of holding a garnish at an airbag accommodating position in which the garnish is contacted with or located close to a vehicle body and the airbag is accommodated therebetween, and at an airbag expansion position in which the garnish is separated from the vehicle body and the airbag is expanded in a passenger compartment, the clip comprising:
a grommet and a pin member, wherein a head portion of the pin member is attached to one of the garnish and the vehicle body and the grommet is attached to the other of the garnish and the vehicle body;
wherein the grommet comprises:
a supporting hole into which the pin member is inserted from a surface side to a back side; and
an engaging portion for preventing the pin member from coming out from the supporting hole,
wherein the pin member further comprises a pair of sidewalls opposed to each other which are extended from the head portion in an axial direction and inserted into the supporting hole of the grommet and capable of relatively moving in the axial direction with respect to the grommet,
wherein each sidewall includes:
a first engaging portion formed on a head portion side which is engaged with the engaging portion of the grommet and holds the garnish at the airbag accommodating position; and
a second engaging portion formed on a distal portion side which is engaged with the engaging portion of the grommet and holds the garnish at the airbag expansion position,
wherein each sidewall forms a flexible region in which an arbitrary region on the distal portion side of the first engaging portion can be elastically deflected inside, and in the airbag expansion position by inwardly deflecting the flexible region exposed from the supporting hole onto the surface side of the grommet, the second engaging portion is displaced according to the deflection of the flexible region so that an engaging state with the engaging portion of the grommet can be released, and wherein the flexible region extends in the axial direction from a side of the second engaging portion closest to the head portion toward the head portion.

2. The clip according to claim 1, wherein the pin member is configured in such a manner that the pair of sidewalls are arranged being opposed to each other at a predetermined interval and a rib is extended in the axial direction at a central position between the sidewalls.

3. The clip according to claim 1, wherein distal portions of the pair of sidewalls are connected to each other by a distal beam, and the second engaging portion comprises an engaging pawl extended from the distal portion being formed into a tapered shape.

4. The clip according to claim 1, wherein the grommet includes a pair of leg portions, which are opposed to each other, extending in the axial direction from a back side opening edge of the supporting hole, the leg portions are engaged with one of the garnish and the vehicle body, the sidewalls can freely move in an intermediate portion, which is interposed between the leg portions, in the axial direction, and the engaging portion is formed in a periphery of a root portion of the leg portions.

5. The clip according to claim 1, wherein the flexible regions formed on the sidewalls are extended in parallel with each other so that a gap formed with an inside face of the supporting hole can be maintained narrow, and
wherein a constricted portion is formed between the flexible region and the first engaging portion.

6. The clip according to claim 5, wherein the pair of sidewalls are connected to each other in the constricted portion by an intermediate beam.

7. The clip according to claim 1, wherein each sidewall includes a constricted portion disposed between the first engaging portion and the second engaging portion such that a thickness of each sidewall decreases as each sidewall extends from the first engaging portion to the constricted portion.

8. The clip according to claim 1, wherein each sidewall includes a constricted portion disposed between the first engaging portion and the second engaging portion such that a distance between an outer periphery of each sidewall decreases as each side wall extends from the first engaging portion toward the constricted portion and the distance between the outer periphery of each sidewall increases as each sidewall extends from the constricted portion toward the flexible region.

9. The clip according to claim 2, wherein the flexible regions of the sidewalls are disposed so as to be separated from the rib by a gap such that, if the flexible regions are inwardly deflected, the sidewalls approach the rib.

10. The clip according to claim 2, wherein the flexible regions of the sidewalls are disposed so as to be separated from the rib by a gap such that, if the flexible regions are inwardly deflected, inner peripheral surfaces of the sidewalls contact the rib.

11. The clip according to claim 3, wherein the sidewalls are continuously formed from the head portion to the distal beam.

12. The clip according to claim 5, wherein a radially outer periphery of the constricted portion forms a V-shape.

13. The clip according to claim 5, wherein the constricted portion comprises a thinnest portion of the sidewalls.

14. The clip according to claim 6, wherein the pair of sidewalls are connected to each other by a lower intermediate beam on a head portion side of the flexible region.

15. The clip according to claim 6, wherein a thickness of the intermediate beam, in the axial direction, is less than a thickness of the intermediate beam, in a radial direction of the pin member.

16. The clip according to claim 2, wherein distal portions of the pair of sidewalls are connected to each other by a distal beam, and
wherein portions of the sidewalls which extend from the flexible regions to the distal beam are unattached to the rib.

17. The clip according to claim 2, wherein distal portions of the pair of sidewalls are connected to each other by a distal beam, and
wherein portions of the sidewalls which extend from the lower intermediate beam between to the distal beam are unattached to the rib.

* * * * *